(12) United States Patent
Riggs et al.

(10) Patent No.: US 7,954,068 B2
(45) Date of Patent: May 31, 2011

(54) EXTENSIBLE MASTER-SLAVE USER INTERFACE WITH DISTINCT INTERACTION MODELS

(75) Inventors: Brian Riggs, San Francisco, CA (US); Daniel J. Cooley, San Francisco, CA (US); Jeremy R. Clark, San Rafael, CA (US); Andrew Borovsky, London (GB)

(73) Assignee: Adobe Systems Incorporated, San Jose, CA (US)

( * ) Notice: Subject to any disclaimer, the term of this patent is extended or adjusted under 35 U.S.C. 154(b) by 431 days.

(21) Appl. No.: 11/697,871

(22) Filed: Apr. 9, 2007

(65) Prior Publication Data

US 2008/0250339 A1    Oct. 9, 2008

(51) Int. Cl.
G06F 3/00 (2006.01)
G06F 3/048 (2006.01)

(52) U.S. Cl. ........ 715/838; 715/720; 715/721; 715/723; 715/861

(58) Field of Classification Search .......... 715/719–723, 715/771, 817, 853, 706, 709, 715, 838, 861
See application file for complete search history.

(56) References Cited

U.S. PATENT DOCUMENTS

| | | | |
|---|---|---|---|
| 5,559,945 A | 9/1996 | Beaudet et al. | |
| 5,708,787 A | 1/1998 | Nakano et al. | |
| 6,104,441 A * | 8/2000 | Wee et al. | 715/723 |
| 7,152,210 B1 * | 12/2006 | Van Den Hoven et al. | 715/723 |
| 7,548,565 B2 * | 6/2009 | Sull et al. | 715/721 |
| 2001/0038394 A1 | 11/2001 | Tsuchimura et al. | |
| 2007/0044035 A1 * | 2/2007 | Amadio et al. | 715/781 |
| 2008/0263449 A1 * | 10/2008 | Schwartz et al. | 715/723 |

FOREIGN PATENT DOCUMENTS

WO    2005072072 A2    8/2005

OTHER PUBLICATIONS

International Search Report and Written Opinion mailed Aug. 26, 2008 in counterpart International Application No. PCT/US08/059683.

* cited by examiner

*Primary Examiner* — Stephen S Hong
*Assistant Examiner* — Truc T Chuong
(74) *Attorney, Agent, or Firm* — Kilpatrick Townsend & Stockton LLP

(57) ABSTRACT

A method, computer system and computer readable medium regarding an extensible master-slave user interface with distinct interaction models is presented. A slave region is displayed in a Graphical User Interface (GUI), the slave region displaying a current state. A master region is displayed in the GUI, the master region displaying a previous state. When a user selects content in the slave region then the master region is removed from the GUI, a new master region is displayed in the GUI, the new master region containing a view of contents of the slave region, the slave region is removed from the GUI and the content selected by the user is displayed in a new slave region in the GUI.

24 Claims, 9 Drawing Sheets

EXTENSIBLE MASTER-SLAVE USER INTERFACE WITH DISTINCT INTERACTION MODELS

BACKGROUND

Today, many computer systems employ graphical user interfaces (GUIs) which users may use to interact with the systems. GUIs often employ graphical elements, such as images, widgets icons and the like, which may represent information and actions available to a user. The actions are usually performed through direct manipulation of the graphical elements.

Many GUIs employ windows which are often used by applications running on a computer system to interact with users. Here, a window may be defined as a visual area, usually rectangular in shape, that contains an interface that may be used to display the output and/or allow the input of information associated with the applications. GUIs that employ windows are often called windowing systems. Examples of windowing systems include, e.g., the X window system and Microsoft Windows.

Many windowing systems employ window managers to control the placement and appearance of windows on a display. The display may include a desktop which is an area that is displayed behind the windows. In a typical arrangement, the window manager displays the windows on top of the desktop by "overlaying" areas of the desktop with the windows such that the windows are seen but not the areas of the desktop behind the windows.

Many window managers include functions that enable windows to be added and deleted from a display. For example, a window manager may contain a function that may be called (invoked) by an application to create a window at a particular location of the display. Likewise, a window manager may contain a function that enables an application to direct the window manager to remove a window from the display.

Often when a window is created for an application, the window manager usually renders only a frame for the window on the display. After rendering the frame, the window manager may then notify the application that the frame has been rendered. After receiving the notification the application may render application specific information within the window's frame.

Typical user interfaces (e.g., GUIs) often times implement a page metaphor, in which transitions from one state to another result in the previous page disappearing and being replaced with a new page. With traditional web content and application interfaces, a user selects an item from a list of available options and the display is refreshed such that the display presents to the user an updated view. Typically the entire page is refreshed. In some scenarios, a bread crumb trail or meta navigation is provided which allows the user to find their way back to where they came from.

SUMMARY

Conventional mechanisms such as those explained above suffer from a variety of deficiencies. One such deficiency is that conventional user interfaces typically leave the user with no context regarding where they came from or what selection triggered the display to update. When the user switches from one page to the next, the user can no longer see the previous page, which often provides useful context regarding how the user navigated to the current page. Additionally, a page often includes different states or layouts based on the context in which the page is being displayed. For example, a list of videos might be displayed with metadata relating to the video (e.g., title, publisher, duration, thumbnail image) when it is the primary element of the user interface, and be displayed with minimal metadata (e.g., title and duration only) when it is a secondary element of the user interface. Further, the user may have no easy way to return to where they came from in a step-by-step manner.

Embodiments of the invention significantly overcome such deficiencies and provide mechanisms and techniques that provide an extensible master-slave user interface with distinct interaction models. Rather than presenting sequential pages, embodiments of the extensible master-slave user interface with distinct interaction models displays two regions, a master region displaying the previous state in a minimalist view and a slave region displaying the current state in a larger view. When a user selects an item in the slave region, the previous master region content goes away and is replaced with a minimalist view of the content which was previously in the slave region. The new content selected by the user is presented in the slave region, while in the master region; the item that was selected by the user is highlighted to indicate to the user what they are viewing in the slave region. A transition may be used to show the previous contents of the slave region moving to the master region. As the user continues to select items in the slave region, there is a linear progression through the content. A path (commonly referred to as a bread-crumb trail) at a meta level within the application displays the position of the slave region's content in relation to a root level. The user can use a "back" button which reverses the lateral progression through the content and returns the user to the previous state in a step-by-step manner.

In a particular embodiment of a method for providing an extensible master-slave user interface with distinct interaction models, the method includes displaying a slave region in a Graphical User Interface (GUI), the slave region displaying a current state. The method also includes displaying a master region in the GUI, the master region displaying a previous state. When a user selects content in the slave region then the master region is removed from the GUI, a new master region is displayed in the GUI, the new master region containing a view of contents of the slave region, the slave region is removed from the GUI and the content selected by the user is displayed in a new slave region in the GUI.

Other embodiments include a computer readable medium having computer readable code thereon for providing progression through a Graphical User Interface (GUI). The computer readable medium includes instructions for displaying a slave region in a GUI, the slave region displaying a current state. The computer readable medium also includes instructions for displaying a master region in the GUI, the master region displaying a previous state. Additionally, the computer readable medium includes instructions for when a user selects content in the slave region then removing the master region from the GUI, displaying a new master region in the GUI, the new master region containing a view of contents of the slave region, removing the slave region from the GUI and displaying the content selected by the user in a new slave region in the GUI.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an extensible master-slave user interface with distinct interaction models as explained herein that when performed (e.g. when executing)

on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an extensible master-slave user interface with distinct interaction models as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
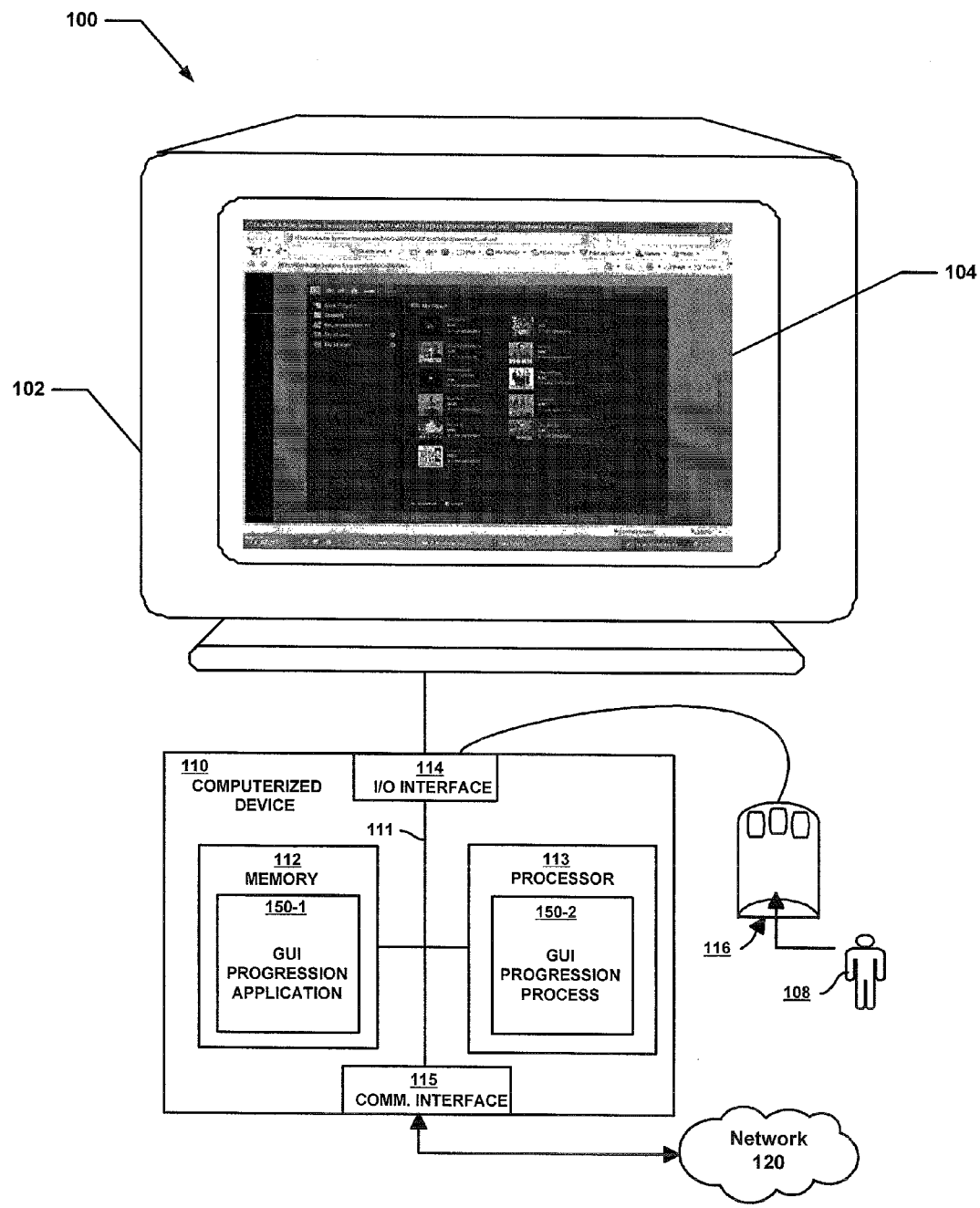
FIG. 1 illustrates an example computer system architecture for a computer system that provides an extensible master-slave user interface with distinct interaction models, in accordance with embodiments of the invention.

FIG. 1 is a block diagram illustrating an example architecture 100 of a computer system 110 that executes, runs, interprets, operates or otherwise provides an extensible master-slave user interface with distinct interaction models (also referred to simply as GUI progression) application 540-1 and a GUI progression process 150-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the an targeted advertisement application 150-1 and an targeted advertisement process 150-2 provides on the display 102. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network 120.

The memory system 112 is any type of computer readable medium, and in this example, is encoded with a GUI progression application 150-1 as explained herein. The GUI progression application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the GUI progression application 150-1. Execution of the GUI progression application 150-1 in this manner produces processing functionality in a GUI progression process 150-2. In other words, the GUI progression process 150-2 represents one or more portions or runtime instances of the GUI progression application 150-1 (or the entire targeted advertisement application 150-1) performing or executing within or upon the processor 113 in the computerized device 110 at runtime.

It is noted that example configurations disclosed herein include the GUI progression application 150-1 itself (i.e., in the form of un-executed or non-performing logic instructions and/or data). The GUI progression application 150-1 may be stored on a computer readable medium (such as a floppy disk), hard disk, electronic, magnetic, optical, or other computer readable medium. The an GUI progression application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of GUI progression application 150-1 in the processor 113 as the GUI progression process 150-2. Those skilled in the art will understand that the computer system 110 may include other processes and/or software and hardware components, such as an operating system not shown in this example.

A display 102 need not be coupled directly to computer system 110. For example, the GUI progression application 150-1 can be executed on a remotely accessible computerized device via the network interface 115. In this instance, the graphical user interface 104 may be displayed locally to a user 108 of the remote computer, and execution of the processing herein may be client-server based.

Figure 2:
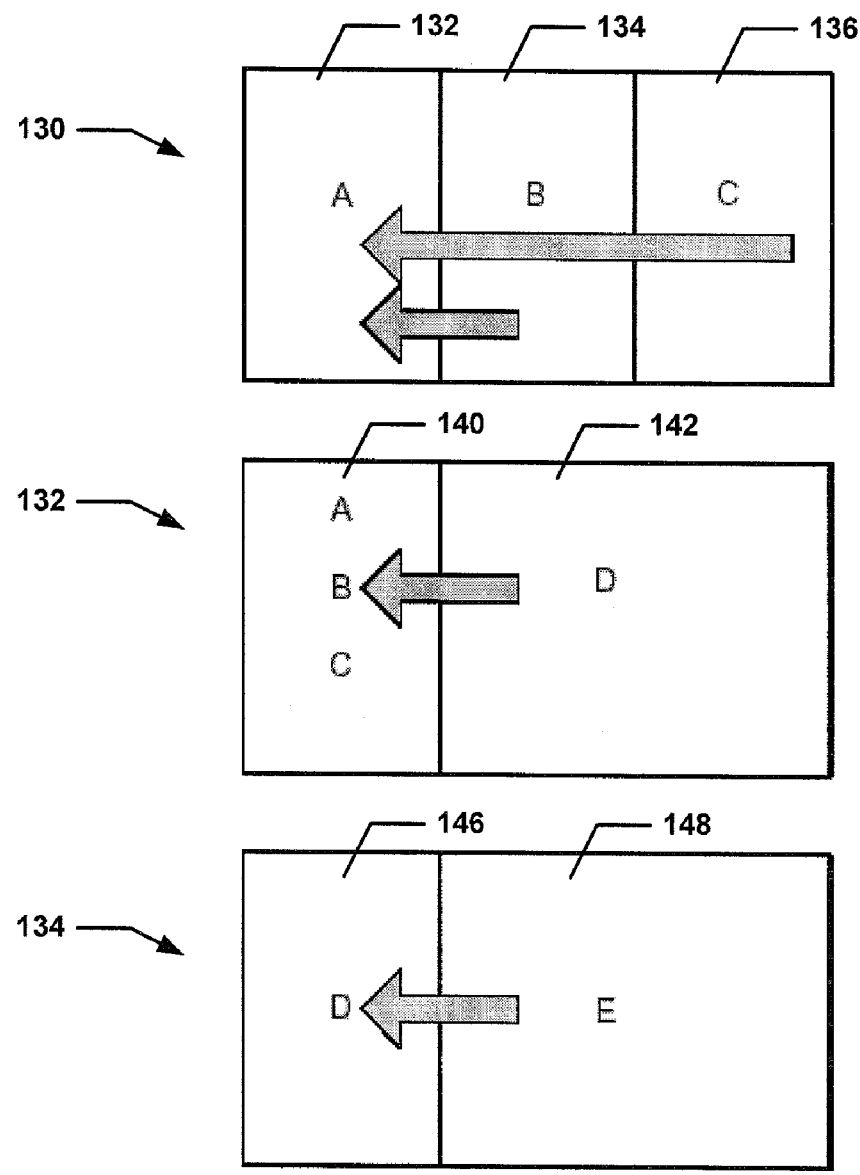
FIG. 2 depicts a block diagram showing the sliding regions of the user interface.

Referring now to FIG. 2, a block diagram showing the sliding regions of the user interfaces is presented. As depicted in the various interfaces, 130, 138 and 144 a sequential sliding of regions (slave to master) occurs based on what has been selected in the master region. For example, the first interface 130 has three regions A, B and C. In the next user interface 138, since D was selected in one of the three regions 132, 134 or 136, the three regions 132, 134, and 136 are now displayed as part of master region 140 and a new slave region D is displayed. When the user selects D in the slave region 142, interface 144 is rendered wherein D I snow shown in new master region 146 and E is shown in slave region 148.

Figure 3:
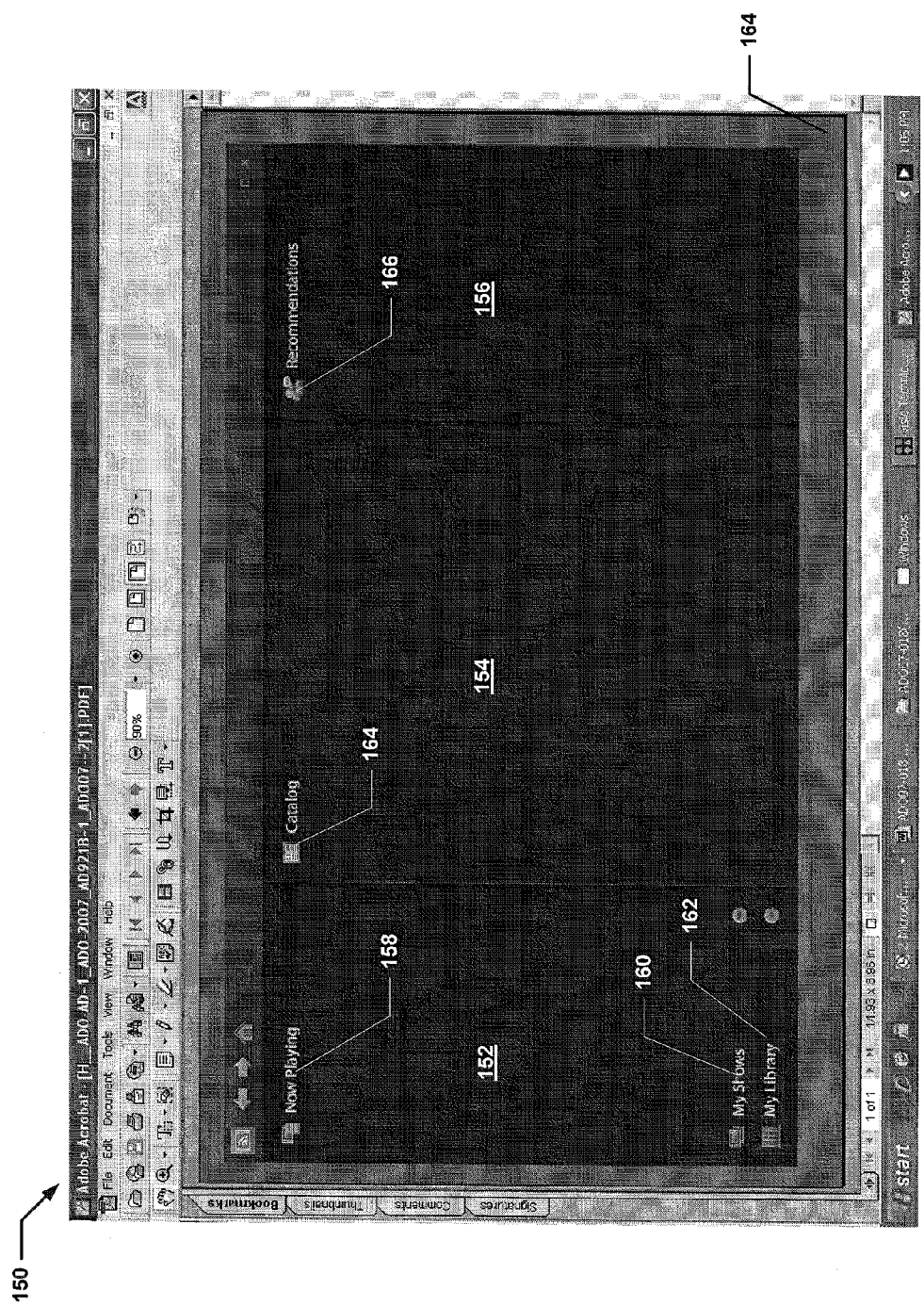
FIG. 3 depicts a screen shot of a first page of an example user interface.

Referring now to FIG. 3, a screen shot 150 of a first page 164 of an example user interface is shown. The user interface, in this example, includes content from three sources presented to the user at the same time. The first content 152 comprises user-selected content based on pre-configured preferences. The user is presented which a variety of choices including a "Now Playing" selection 158, a "My Shows" selection 160 and a "My Library" selection 162. The second content 154 comprises user induced/producer selected content such as recommendations based on the user's past usage of content, and includes a "Catalog" selection 164. The third content 156 comprises default producer selected content such as feature content and includes a "Recommendations" selection 166. In this user interface, three content lists have been combined such that a user only has to click once to select the content the user would like to invoke.

Figure 4:
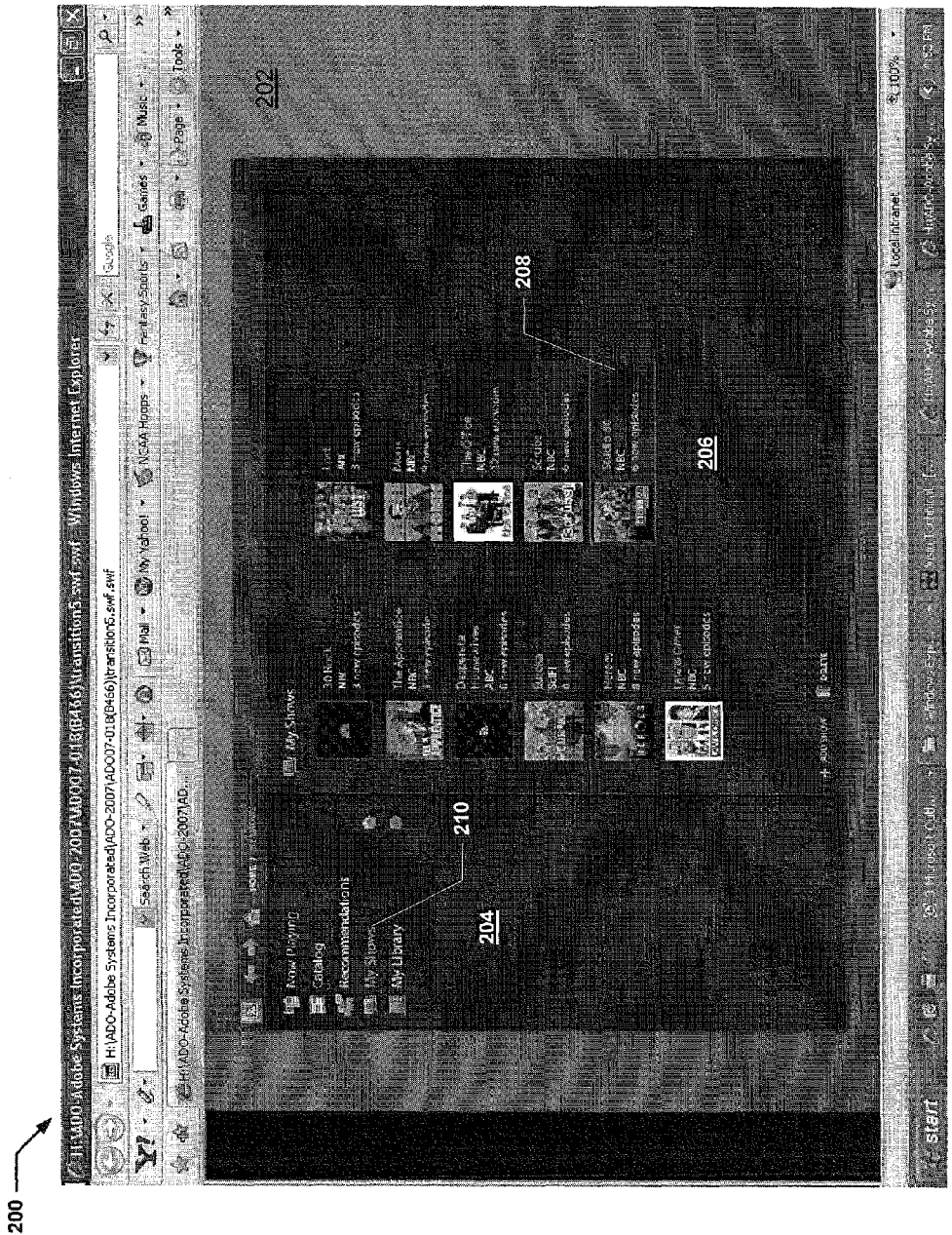
FIG. 4 depicts a screen shot of a next screen of the user interface showing a first slave region and a first master region.

FIG. 4 depicts a screen shot 200 of a next screen 202 of the user interface showing a first slave region 206 and a first master region 204. The user was able to reach this screen by clicking on the "My Shows" selection 160 in the prior screen (FIG. 2). The screen of FIG. 3 including the three content areas 152, 154 and 156 are now rendered in a master region 204 in a minimalist view. A slave region 206 is rendered adjacent to master region 204. While the slave region is shown horizontally adjacent to the master region, it should be appreciated that the slave region could also have been rendered vertically adjacent the master region or in any other type of arrangement wherein both the slave region and the master region are presented to the user concurrently.

The "My Shows" selection is highlighted in master region 204 to indicate to the user how the user was able to progress to the content in the slave region 206. In slave region 206 the content of "My Shows" is presented. A representation of each show in the "My Shows" content includes details regarding the show. For example, the show Studio 60 is highlighted and includes a thumbnail of the show, the title of the show (Studio 60), the show's broadcast company (NBC), and the number of new episodes (6 in this case) of the show.

Figure 5:
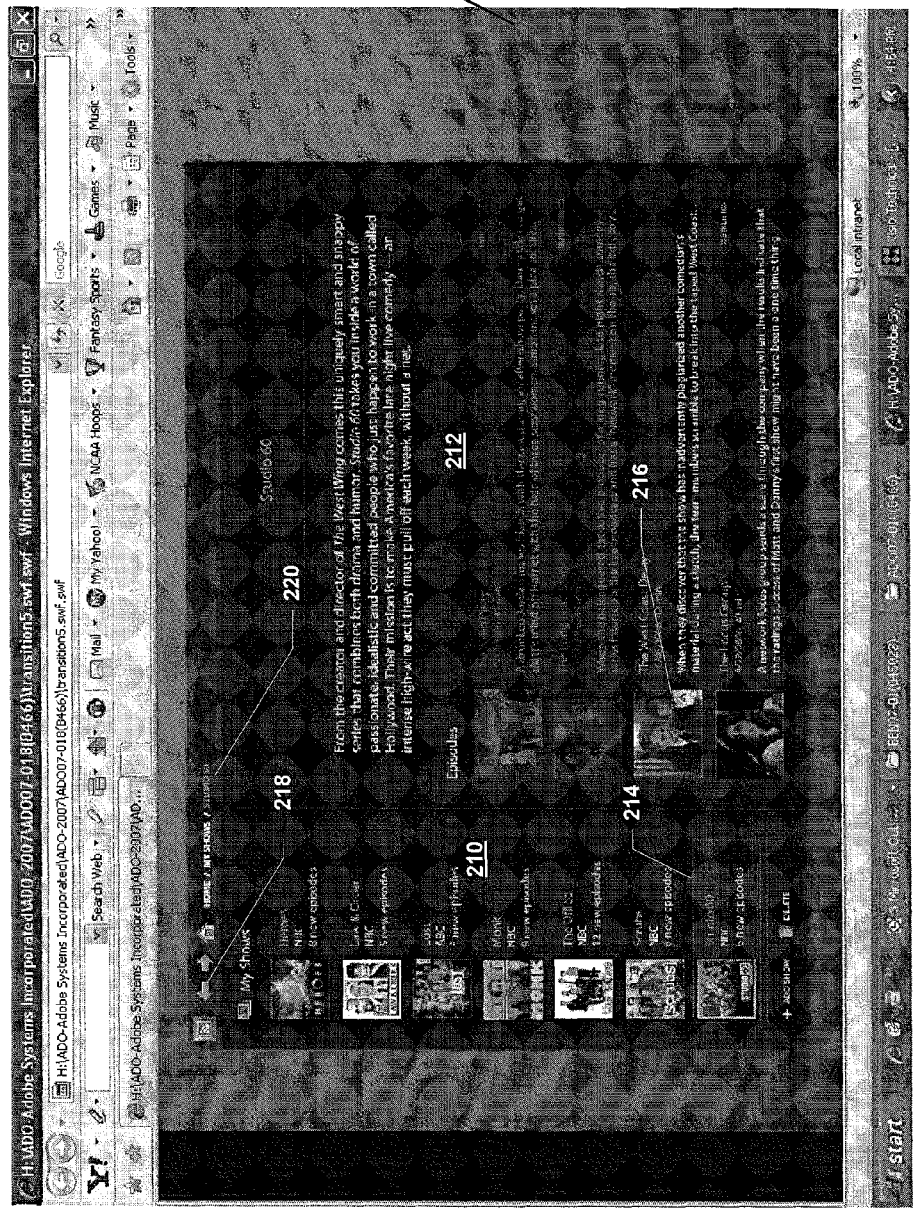
FIG. 5 depicts a screen shot of a next screen of the user interface showing a second slave region and a second master region wherein the second master region contains a minimalist view of the previous contents of the slave region, in accordance with embodiments of the invention.

Referring now to FIG. 5, a screen shot of a next screen 222 of the user interface showing a second slave region 212 and a second master region 210 wherein the second master region 210 contains a minimalist view of the previous contents of the slave region is presented. The user, having selected the "Studio 60" representation in the previous screen is presented with this user interface. In this interface page 222, the previous master region (204 of FIG. 4) has been replaced with a new master region 210, which comprises the former slave region (206 of FIG. 4), in a minimalist format. A new slave region 212 has been rendered. In this example, the slave region 212 includes a description of the show and representations of four episodes of the Studio 60 show. In master region 210 the content selection 214 for Studio 60 is highlighted, providing an indicator to the user how the user has progressed to the current state. A transition effect may be used wherein the contents of the previous slave region is transitioned into the new master region 210. Transitions can include fade-in, fade-out and the like.

On this user interface a back button 218 is also shown which would result in the user interface of FIG. 4 being rendered when the user clicks the back button 218. Also present in the user interface is a so-called "bread-crumb" trail 220 showing the different states the user has progressed through from an initial or root state to the current state. In this example, the breadcrumb trail is "HOME/MY SHOWS/STUDIO 60. The content in the slave region is presented in a different way than the content in the master region. In the master region a minimalist view is presented, whereas in the slave region a larger, full view is presented. In one embodiment the minimalist view is a summarized or abbreviated set of details about the content, or a subset of the details presented in the full view.

Additionally, different interaction models may be used in the slave region and the master region. In a particular example, the interaction model for a master region comprises a "web-style" interaction model, wherein a single click is used to active a selection, similar to a web browser interaction model. In the slave region a desktop application interaction model is used wherein a single click makes a selection and a double click activates the selection. Because there is a slave/master relationship between the regions, a slave/master interaction model is also implemented. A user gesture in the master region is likely to affect the slave region due to the slave regions subordinate role to the master region.

Figure 6:
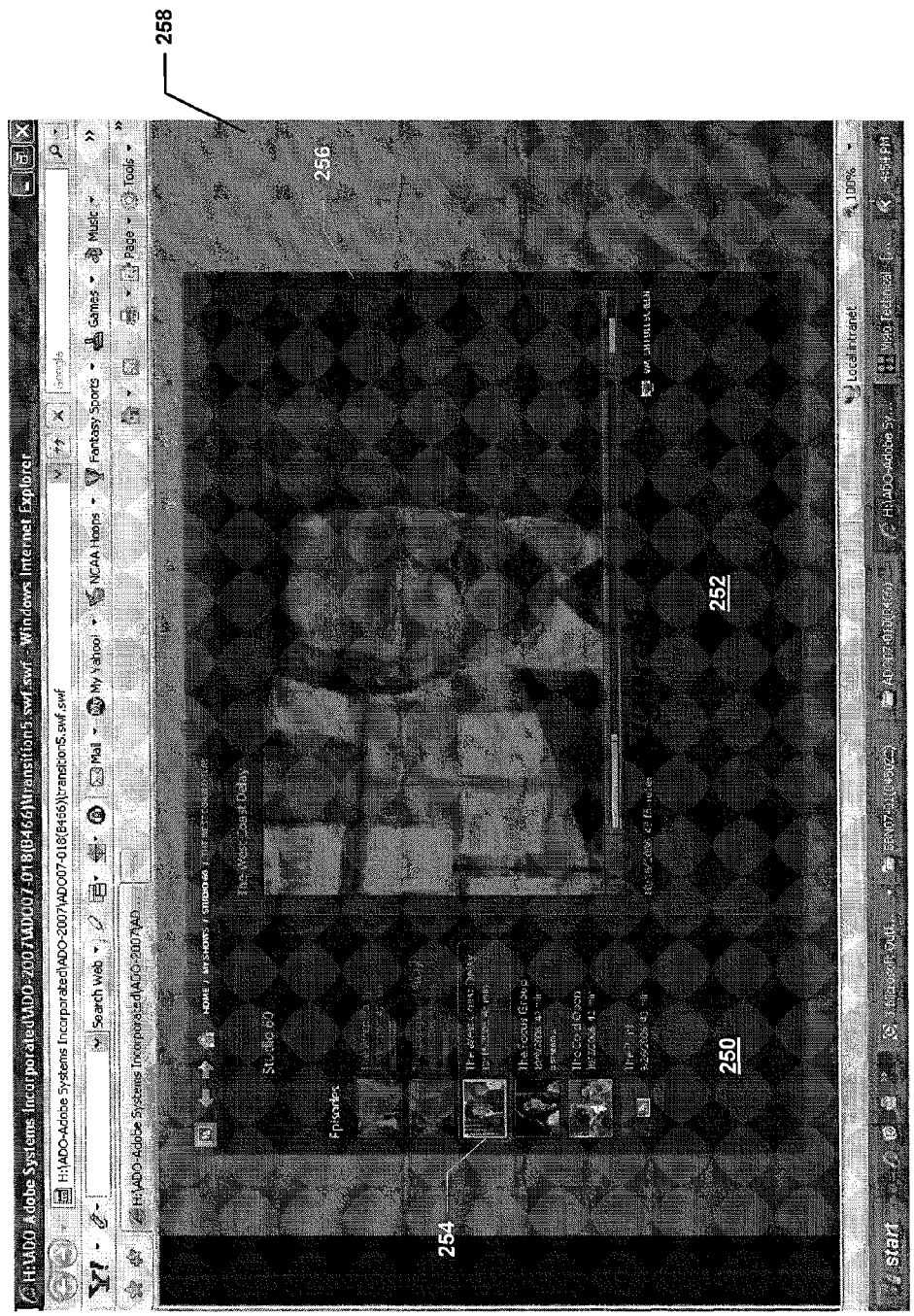
FIG. 6 depicts a screen shot of a next screen of the user interface showing a third slave region and a third master region containing a minimalist view of the previous contents of the second slave region, in accordance with embodiments of the invention.

Referring now FIG. 6 a screen shot of a next screen of the user interface showing a new slave region 252 and a new master region 250 is presented. The master region 250 contains a minimalist view of the previous contents of the slave region. The user, having selected a particular episode of "Studio 60" in the previous screen is presented with this user interface. In this interface page 258, the previous master region (210 of FIG. 5) has been replaced with a new master region 250, which comprises the former slave region (212 of FIG. 5), presented in a minimalist format. A new slave region 252 has been rendered. In this example, the slave region 252 includes a representation of a video player 256 showing the selected episode of the Studio 60 show. In master region 250 the content selection 254 for the particular episode of Studio 60 is highlighted, providing an indicator to the user how the user has progressed to the current state. A transition effect may be used wherein the contents of the previous slave region is transitioned into the new master region 250. On this user interface a back button 218 is also shown which would result in the user interface of FIG. 4 being rendered when the back button 218 is clicked. The content in the slave region is presented in a different way than the content in the master region. In the master region a minimalist view is presented, whereas in the slave region a larger, full view is presented.

In this application for providing an extensible master-slave user interface with distinct interaction models a Region is a user interface class which defines an area on the display. A Region has the notion of a configuration state, which is essentially whether the Region is a slave region or a master region. Thus a Region object is responsible for organizing its visual presentation based on the state the Region is in, and a Region has knowledge of what other Regions exist and what relationships there may be between Regions. Regions are organized into RegionGroups. A RegionGroup is a definition of a particular group of Regions that should appear at the same time on the display (generally a slave region and a master region), as well as what other RegionGroups that particular RegionGroup can transition to. For example, one RegionGroup might contain a slave region which displays a list of television (TV) shows and a master region which displays a list of episodes for the particular TV show. This RegionGroup definition will state that when an episode in the master region is selected (as determined by an event that the region dispatches), the application should load a new RegionGroup in which the list of episodes is the master region and a video player that plays the episode is the slave region.

The management of these transitions is performed by a RegionStateMachine, which is a faceless object which has knowledge of all RegionGroups, and can produce and destroy regions as they become active or inactive. A RegionPanel is a user object which is responsible for displaying a pair of regions. The RegionPanel ensures that regions are sized appropriately, that visual effects are performed during transitions from one RegionGroup to another, and that the user's interaction with the region is handled according to the appropriate interaction model (e.g., web type or desktop type).

While a single slave region and a single master region have been discussed, it should be appreciated that multiple master regions could also be rendered as part of the user interface page. In this scenario, each additional master region would contain a minimalist view of the previous state in a linear progression.

Figure 7:
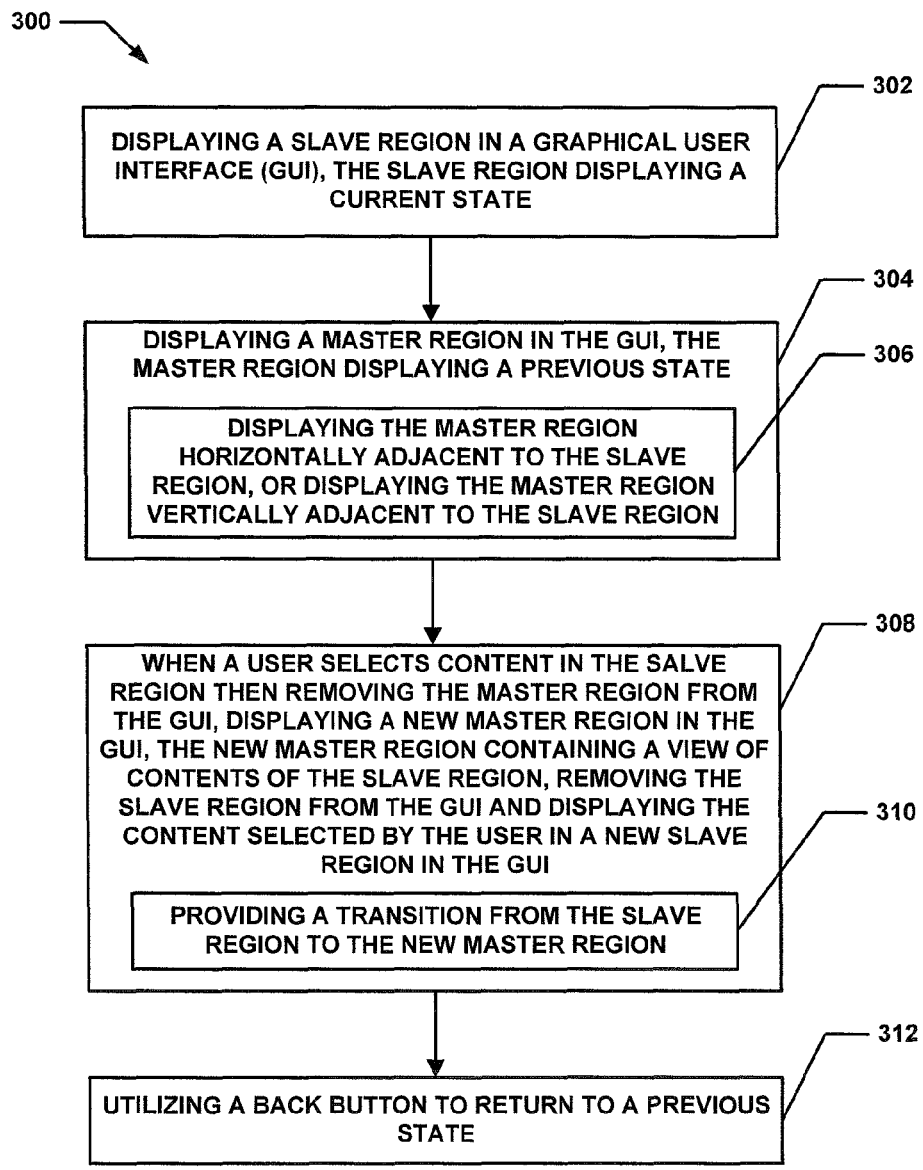
FIG. 7 depicts a flow diagram of a particular embodiment of a method which provides an extensible master-slave user interface with distinct interaction models, in accordance with embodiments of the invention.
Figure 8:
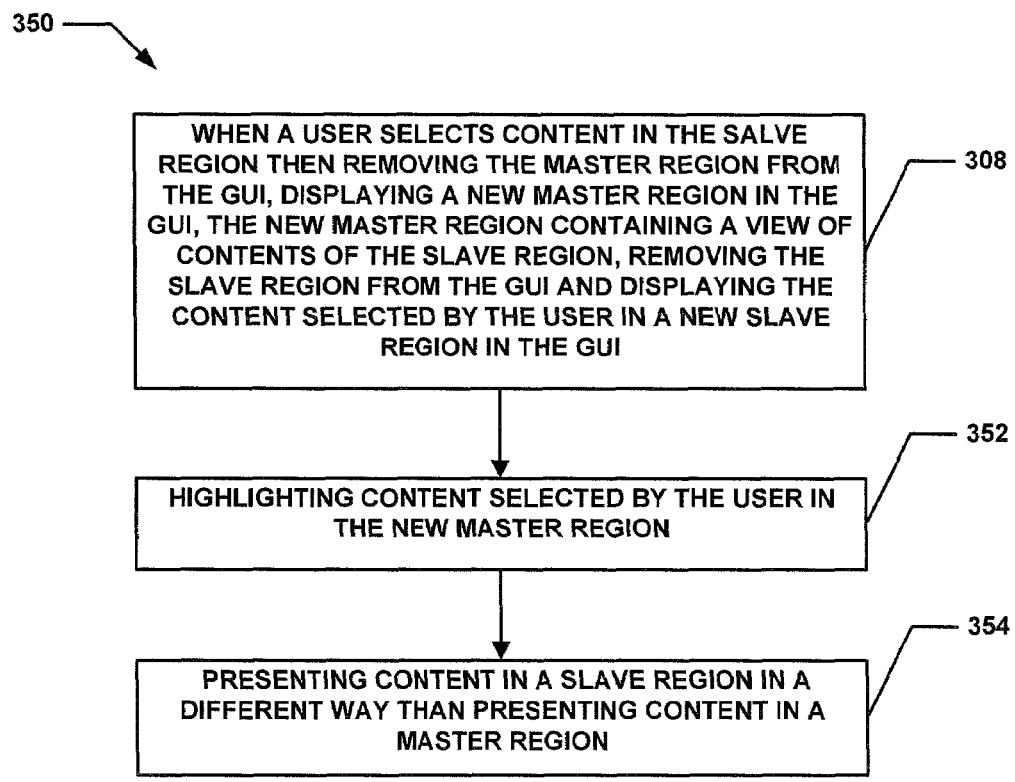
FIG. 8 depicts a flow diagram of a particular embodiment of a method which provides presenting a new slave region and master region wherein the content selected by the user is highlighted in the new master region and wherein content is presented in a different way for a master region than for a slave region in accordance with embodiments of the invention.
Figure 9:
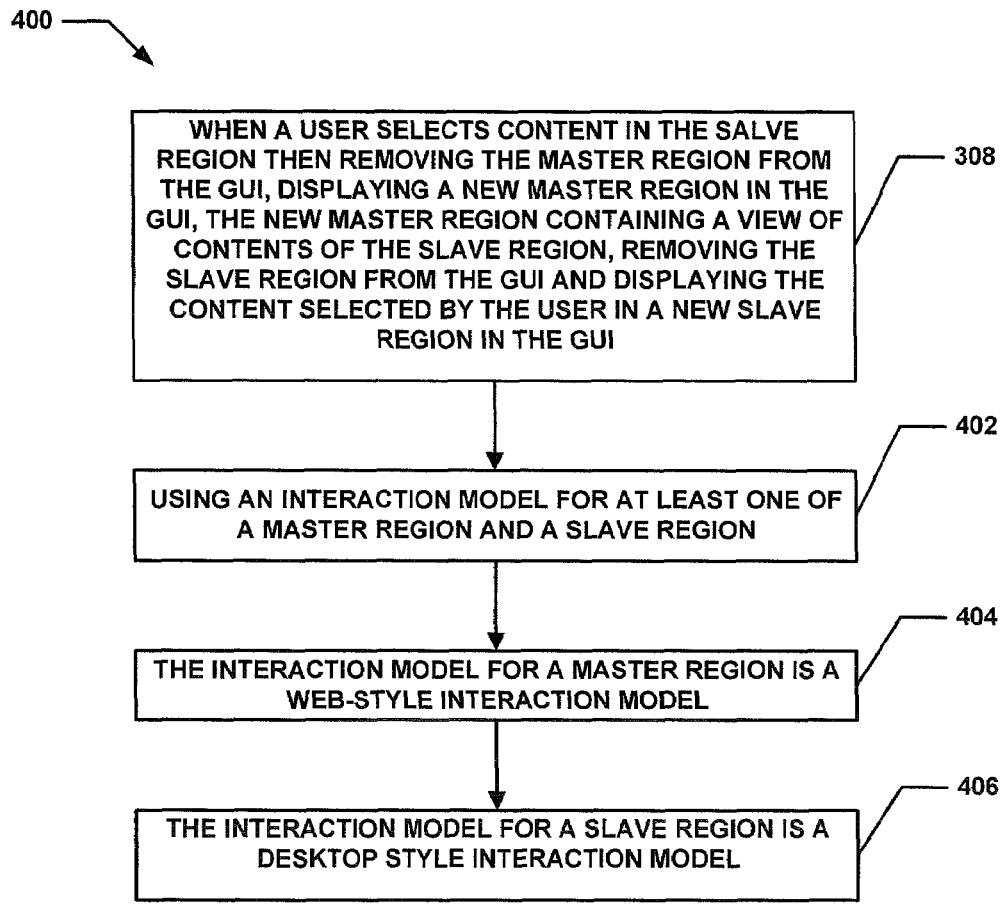
FIG. 9 depicts a flow diagram of a particular embodiment of a method which provides for a different interaction model for a slave region than for a master region in accordance with embodiments of the invention

Flow charts of the presently disclosed methods are depicted in FIGS. 7 through 9. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 7, a particular embodiment of a method 300 of providing an extensible master-slave user interface with distinct interaction models is shown. The method 300 begins with processing block 302 which discloses displaying a slave region in a Graphical User Interface (GUI), the slave region displaying a current state.

Processing block 304 states displaying a master region in the GUI, the master region displaying a previous state. As recited in processing block 306, the displaying a master region in the GUI comprise at least one of the group consisting of displaying the master region horizontally adjacent to the slave region, and displaying the master region vertically adjacent to the slave region. Other ways of displaying the master region and the slave region may also be used, as long as both regions are rendered on the display.

Processing continues with processing block 308 which recites when a user selects content in the slave region then removing the master region from the GUI, displaying a new master region in the GUI, the new master region containing a view of contents of the slave region, removing the slave region from the GUI and displaying the content selected by the user in a new slave region in the GUI. As stated in processing block 310 a transition from the slave region to the new master region may be provided. The transition may be a fade-in transition, a fade-out transition or the like.

Processing block 312 discloses utilizing a back button to return to a previous state. The back button is sued to return the next state in a reverse linear progression from the current state to a root state.

Referring now to the flow diagram of FIG. 8, a flow diagram of a particular embodiment of a method 350 which provides presenting a new slave region and master region is shown. The method 350 begins with processing block 308 which recites when a user selects content in the slave region then removing the master region from the GUI, displaying a new master region in the GUI, the new master region containing a view of contents of the slave region, removing the slave region from the GUI and displaying the content selected by the user in a new slave region in the GUI.

Processing block 352 discloses highlighting content selected by the user in the new master region. This is done to provide a visual indication to the user how the user has progressed from the prior state to the present state.

Processing block 354 states presenting content in a slave region in a different way than presenting content in a master region. In a slave region, because a larger full view is provided, it may make sense to provide additional content. For example, in a slave region the content may include a thumbnail of a show, the title of the show, the show's broadcast company and the number of new shows, whereas in a minimalist view on a master region, the content may only include a thumbnail of the show and the title.

Referring now to FIG. 9, a flow diagram of a particular embodiment of a method 400 which provides for a different interaction models is shown. Processing begins with processing block 308 which recites when a user selects content in the slave region then removing the master region from the GUI, displaying a new master region in the GUI, the new master region containing a view of contents of the slave region, removing the slave region from the GUI and displaying the content selected by the user in a new slave region in the GUI.

Processing block 402 discloses using an interaction model for at least one of a slave region and a master region. In a particular example, the interaction model for a master region comprises a "web-style" interaction model, wherein a single click is used to active a selection, similar to a web browser interaction model. In the slave region a desktop application interaction model is used wherein a single click makes a selection and a double click activates the selection As stated in processing block 404 this may include wherein the interaction model for a slave region is a web-style interaction model. As recited in processing block 406 this may include wherein the interaction model for a master region is a desktop style interaction model. Because there is a slave/master relationship between the regions, a slave/master interaction model is also implemented. A user gesture in the master region is likely to affect the slave region due to the slave regions subordinate role to the master region.

As described above, particularly embodiments of an extensible master-slave user interface with distinct interaction models for linear progression through an application has been presented. As a user interacts with the application the user interface can change so that a slave region becomes a master region and a new slave region is introduces. As a region changes its state from a slave region to a master region or from a master region to slave region, the regions content may be presented in different ways. Also the interaction model may be different for a region based on whether the region is a slave region or a master region. A master region may use a web-style single click interaction model whereas a slave region may use a desktop-style double click interaction model.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A computer implemented method comprising:
   displaying a slave region in a Graphical User Interface (GUI), said slave region displaying a current state and having previously displayed a previous state;
   displaying a master region in said GUI, said master region displaying at least a portion of the previous state of the slave region, said master region concurrently displayed on said GUI with said slave region;
   upon detecting a selection of content in said slave region, displaying a visually perceptible transition that concurrently reveals (i) a new master region and (ii) a new slave region, the visually perceptible transition gradually revealing said new master region as said master region recedes from view in the GUI, the visually perceptible transition gradually revealing said new slave region as said slave region recedes from view in the GUI; and
   upon completion of said visually perceptible transition, concurrently displaying said new master region and said new slave region in said GUI, said new master region displaying at least a portion of the current state that was displayed by said slave region prior to the selection of content, said new slave region displaying at least some new content based on the selection of content.

2. The method of claim 1 further comprising presenting content in a slave region in a different way than presenting content in a master region.

3. The method of claim 1 further comprising using an interaction model for at least one of a slave region and a master region.

4. The method of claim 3 wherein the interaction model for a master region is a web-style interaction model.

5. The method of claim 3 wherein the interaction model for a slave region is a desktop style interaction model.

6. The method of claim 1 wherein said displaying a slave region in the GUI, and said displaying a master region in said GUI comprise at least one of the group consisting of displaying said master region horizontally adjacent to said slave region, and displaying said master region vertically adjacent to said slave region.

7. The method of claim 1 comprising:
   identifying at least one region object;
   identifying a configuration state, the configuration state identifying the at least one region object from a group consisting of the slave region and the master region, the configuration state maintained by the at least one region object; and
   identifying a region group, the region group associating a plurality of region objects to be rendered concurrently.

8. The method of claim 7 wherein identifying a region group comprises:
   identifying a plurality of transition region objects to be rendered upon selection of the at least one region object.

9. The method of claim 7 wherein identifying at least one region object comprises:
   identifying a plurality of region relationships between a plurality of regions, the plurality of region relationships maintained by each respective region object.

10. The computer implemented method as in claim 1, comprising:
    upon completion of said visually perceptible transition, concurrently displaying a navigation trail with said new master region and said new slave region, said navigation trail concurrently indicating said master region, said new master region and said new slave region.

11. The computer implemented method as in claim 10, comprising:
    wherein displaying the master region includes: displaying an individually selectable representation of a node in the master region, the node located on a first level of a hierarchy of content, the GUI comprising an application window rendered by an application, the master region displayed within the application window;
    wherein displaying the slave region includes: displaying, in the slave region, a plurality of individually-selectable portions of content, the portions of content located on a second level, the second level deeper than the first level, the portions of content on the second level connected to the node on the first level, the slave region displayed within the application window;
    wherein displaying the new master region includes: displaying, in the new master region, a minimalist view of the plurality of individually-selectable portions of content located on the second level, the new master region displayed within the application window; and
    wherein displaying the new slave region includes: displaying playback of the selected content, the select content identified upon receiving selection of one of the plurality of individually-selectable portions of content displayed in the slave region, the new slave region displayed within the application window.

12. The computer implemented method as in claim 11, wherein displaying the navigation trail with said new master region and said new slave region includes:
displaying a name of the node as a first portion of the navigation trail;
displaying a name of the second level as a second portion of the navigation trail;
displaying a name of the selected content as the third portion of the navigation trail; and
displaying the navigation trail in a toolbar portion of the application window.

13. The computer implemented method as in claim 10, wherein displaying the navigation trail with said new master region and said new slave region includes:
displaying a first identifier of content from a first hierarchy level, the first identifier comprising a first portion of the navigation trail, a representation of the content from the first hierarchy level displayed in the master region;
displaying a second identifier of content from a second hierarchy level, the second identifier comprising a second portion of the navigation trail, the second hierarchy level (i) deeper than the first hierarchy level and (ii) connected to the content from the first hierarchy level, a representation of the content from the second hierarchy level displayed in the slave region; and
displaying a third identifier of the selected content, the third identifier comprising a third portion of the navigation trail; and
displaying the navigation trail in the GUI, the GUI comprising an application window rendered by an application, wherein the visually perceptible transition, the master region, the slave region, the new master region and the new slave region each displayed within the application window.

14. The computer implemented method as in claim 13, wherein displaying the navigation trail includes:
displaying the navigation trail in a toolbar portion of the application window.

15. The computer implemented method as in claim 10, wherein displaying the slave region includes:
displaying the slave region in the GUI, wherein the GUI comprises an application window rendered by an application, wherein the visually perceptible transition, the navigation trail, the master region, the new master region and the new slave region are each displayed within the application window.

16. The computer implemented method as in claim 1, comprising:
wherein displaying said new master region includes displaying a representation of said selected content; and
wherein displaying said new slave region includes displaying a visible playback of said selected content.

17. The computer implemented method as in claim 16, wherein displaying a representation of said selected content includes:
displaying a screen shot representative of video content; and
wherein displaying a visible playback of said selected content includes:
displaying a video player within said slave region, said video player executing a visible playback of said video content.

18. The computer implemented method as in claim 1, wherein displaying the visually perceptible transition includes:
displaying a first animated fade-out of said master region;
displaying a first animated fade-in of said new master region;
displaying a second animated fade-out of said slave region; and
displaying a second animated fade-in of said new slave region.

19. A non-transitory computer readable medium having computer readable code thereon for providing an extensible master-slave user interface with distinct interaction models, the medium comprising:
instructions for displaying a slave region in a Graphical User Interface (GUI), said slave region displaying a current state and having previously displayed a previous state;
instructions for displaying a master region in said GUI, said master region displaying at least a portion of the previous state of the slave region, said master region concurrently displayed on said GUI with said slave region;
instructions for displaying a visually perceptible transition, upon detecting a selection of content in said slave region, that concurrently reveals (i) a new master region and (ii) a new slave region, the visually perceptible transition gradually revealing said new master region as said master region recedes from view in the GUI, the visually perceptible transition gradually revealing said new slave region as said slave region recedes from view in the GUI; and
instructions for concurrently displaying said new master region and said new slave region in said GUI upon completion of said visually perceptible transition, said new master region displaying at least a portion of the current state that was displayed by said slave region prior to the selection of content, said new slave region displaying at least some new content based on the selection of content.

20. The non-transitory computer readable medium of claim 19 further comprising instructions for presenting content in a slave region in a different way than presenting content in a master region.

21. The non-transitory computer readable medium of claim 19 further comprising instructions for using an interaction model for at least one of a slave region and a master region.

22. The non-transitory computer readable medium of claim 19 wherein said instructions for displaying a slave region in the GUI, and said displaying a master region in said GUI comprise at least one of the group consisting of instructions for displaying said master region horizontally adjacent to said slave region, and instructions for displaying said master region vertically adjacent to said slave region.

23. A computer system comprising:
a memory;
a processor;
a communications interface;
an interconnection mechanism coupling the memory, the processor and the communications interface; and
wherein the memory is encoded with an application providing an extensible master-slave user interface with distinct interaction models, that when performed on the processor, provides a process for processing information, the process causing the computer system to perform the operations comprising:

displaying a slave region in a Graphical User Interface (GUI), said slave region displaying a current state, the slave region having previously displayed a previous state;

displaying a master region in said GUI, said master region displaying at least a portion of the previous state of the slave region, said master region concurrently displayed on said GUI with said slave region;

upon detecting a selection of content in said slave region, displaying a visually perceptible transition that concurrently reveals (i) a new master region and (ii) a new slave region, the visually perceptible transition gradually revealing said new master region as said master region recedes from view in the GUI, the visually perceptible transition gradually revealing said new slave region as said slave region recedes from view in the GUI; and upon completion of said visually perceptible transition, concurrently displaying said new master region and said new slave region in said GUI, said new master region displaying at least a portion of the current state that was displayed by said slave region prior to the selection of content, said new slave region displaying at least some new content based on the selection of content.

24. A computer implemented method comprising:

displaying a slave region in a Graphical User Interface (GUI), said slave region displaying a current state;

displaying a master region in said GUI, said master region displaying a previous state, said master region concurrently displayed on said GUI with said slave region;

upon detecting a selection of content in said slave region, displaying a visually perceptible transition that concurrently reveals (i) a new master region and (ii) a new slave region, the visually perceptible transition gradually revealing said new master region as said master region recedes from view in the GUI, the visually perceptible transition gradually revealing said new slave region as said slave region recedes from view in the GUI; and upon completion of said visually perceptible transition, concurrently displaying said new master region and said new slave region in said GUI, said new master region containing a view of contents previously displayed by said slave region, said new slave region displaying selected content in said new slave region;

the computer-implemented method further comprising:

upon completion of said visually perceptible transition, concurrently displaying a navigation trail with said new master region and said new slave region, said navigation trail concurrently indicating said master region, said new master region and said new slave region;

wherein displaying the visually perceptible transition includes:
  displaying a first animated fade-out of said master region;
  displaying a first animated fade-in of said new master region;
  displaying a second animated fade-out of said slave region; and
  displaying a second animated fade-in of said new slave region, the first animated fade-out, the second animated fade-out, the first animated fade-in and the second animated fade-in each visibly occurring concurrently;

wherein displaying said new master region includes displaying a screen shot representative of said selected content;

wherein displaying said new slave region includes displaying a visible playback of said selected content; and wherein displaying the visually perceptible transition includes:
  representing navigation between tiers in a hierarchy of content representation, wherein the hierarchy of content representation provides that any master region displays a selectable representation of content while a concurrently displayed slave region provides a more detailed representation of content selected from the master region.

* * * * *